US010027247B2

(12) United States Patent
Allert et al.

(10) Patent No.: US 10,027,247 B2
(45) Date of Patent: Jul. 17, 2018

(54) INVERTER, METHOD FOR OPERATING AN INVERTER AND ENERGY SUPPLY INSTALLATION WITH AN INVERTER

(71) Applicant: SMA SOLAR TECHNOLOGY AG, Niestetal (DE)

(72) Inventors: Claus Allert, Kaufungen (DE); Thorsten Buleo, Kassel (DE); Markus Hopf, Espenau (DE)

(73) Assignee: SMA Solar Technology, Niestetal (DE)

( * ) Notice: Subject to any disclaimer, the term of this patent is extended or adjusted under 35 U.S.C. 154(b) by 520 days.

(21) Appl. No.: 14/758,974

(22) PCT Filed: Oct. 22, 2013

(86) PCT No.: PCT/EP2013/072075
§ 371 (c)(1),
(2) Date: Jul. 2, 2015

(87) PCT Pub. No.: WO2014/064108
PCT Pub. Date: May 1, 2014

(65) Prior Publication Data

US 2015/0333657 A1 Nov. 19, 2015

(30) Foreign Application Priority Data

Oct. 23, 2012 (DE) ........................ 10 2012 110 110

(51) Int. Cl.
*H02J 3/38* (2006.01)
*H02J 3/26* (2006.01)
(Continued)

(52) U.S. Cl.
CPC ................. *H02M 7/44* (2013.01); *H02J 3/26* (2013.01); *H02J 3/34* (2013.01); *H02J 9/062* (2013.01);
(Continued)

(58) Field of Classification Search
CPC ...... H02J 2003/388; H02J 3/381; H02J 3/383; H02J 9/062; Y02B 10/10; Y02B 10/14; Y02B 10/72; Y02E 10/563; Y02E 40/72
See application file for complete search history.

(56) References Cited

U.S. PATENT DOCUMENTS 6,069,779 A 5/2000 Glavitsch et al.
6,317,346 B1 11/2001 Early
(Continued)

FOREIGN PATENT DOCUMENTS

CN 1835332 A 9/2006
EP 1928081 A2 6/2008
(Continued)

OTHER PUBLICATIONS

Written Opinion of the International Searching Authority, PCT/EP2013/072075, dated Apr. 23, 2015.
(Continued)

*Primary Examiner* — Ryan Johnson
(74) *Attorney, Agent, or Firm* — Eschweiler & Potashnik, LLC

(57) ABSTRACT

The invention relates to an inverter with at least one DC input for connecting to an energy producing device and/or an energy store and with a multiphase AC output for connecting to a local energy distribution network, which is coupled to a likewise multiphase master energy supply network via a switching device. The inverter is characterised in that it has a control terminal for connecting to the switching device such that individual phases of the local energy distribution network can be selectively connected to or disconnected from corresponding phases of the energy supply network via the control terminal, and is intended, in the event of a network error of at least one but not all phases of the energy supply network, to separate, via the control terminal, the at least one defective phase of the energy supply network from
(Continued)

Figure 1:
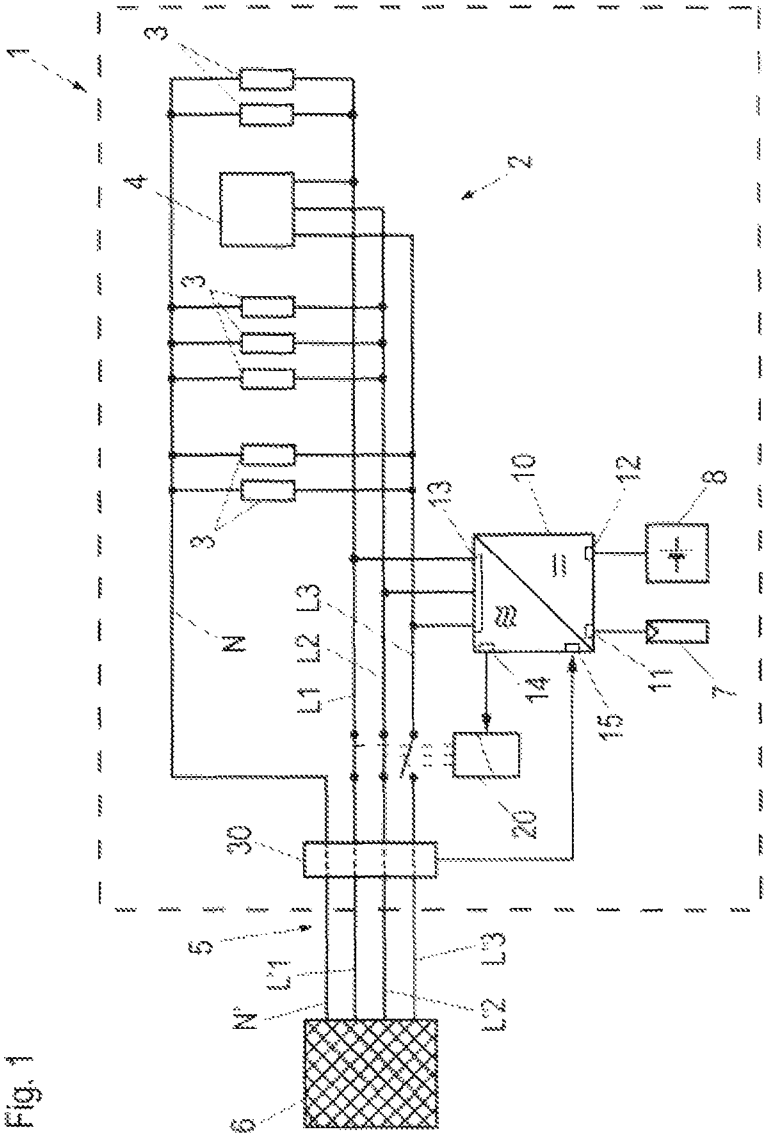

the corresponding phase of the local energy distribution network and to supply the at least one separated phase of the local energy distribution network with network-compatible alternating voltage. The invention also relates to a method for operating such an inverter and to an energy supply installation with an inverter.

15 Claims, 2 Drawing Sheets

(51) Int. Cl.

| | |
|---|---|
| ***H02M 7/44*** | (2006.01) |
| ***H02J 3/34*** | (2006.01) |
| ***H02J 9/06*** | (2006.01) |

(52) U.S. Cl.

CPC ......... *H02J 3/383* (2013.01); *H02J 2003/388* (2013.01); *Y02B 10/14* (2013.01); *Y02B 10/72* (2013.01); *Y02E 10/563* (2013.01); *Y02E 10/566* (2013.01); *Y02E 40/50* (2013.01); *Y02P 80/14* (2015.11); *Y10T 307/305* (2015.04)

(56) References Cited

U.S. PATENT DOCUMENTS

| | | | | |
|---|---|---|---|---|
| 6,862,163 | B2 | 3/2005 | Schierling et al. | |
| 7,138,728 | B2 * | 11/2006 | LeRow | H02J 3/38 307/30 |
| 8,837,098 | B2 * | 9/2014 | Victor | H01L 31/02021 361/42 |
| 9,270,117 | B2 | 2/2016 | Umland | |
| 2012/0126626 | A1 | 5/2012 | Falk et al. | |
| 2012/0280566 | A1 | 11/2012 | Umland | |
| 2013/0182477 | A1 | 7/2013 | De Brabandere et al. | |

FOREIGN PATENT DOCUMENTS

| | | | | |
|---|---|---|---|---|
| WO | 2011141807 | A2 | 11/2011 | |
| WO | WO 2011138319 | A1 * | 11/2011 | H01L 31/02021 |

OTHER PUBLICATIONS

International Search Report, PCT/EP2013/072075, dated Jan. 5, 2014.

* cited by examiner

INVERTER, METHOD FOR OPERATING AN INVERTER AND ENERGY SUPPLY INSTALLATION WITH AN INVERTER

CROSS-REFERENCE TO RELATED APPLICATIONS

This application is a continuation of PCT/EP2013/072075, filed on Oct. 22, 2013 and claims priority to German Application no. 10 2012 110 110.8 filed on Oct. 23, 2012 and incorporated herein by reference in their entirety.

FIELD

The invention relates to an inverter, in particular a solar or battery inverter, comprising at least one DC (direct current) input for connection to an energy generation device and/or an energy storage device and comprising a polyphase AC (alternating current) output for connection to a local energy distribution grid, which is coupled to a likewise polyphase superordinate energy supply grid. The invention furthermore relates to a method for operating such an inverter and to an energy supply installation comprising an inverter.

BACKGROUND

Inverters of this type are used, for example, in conjunction with a building-integrated photovoltaic system. The energy generated by a photovoltaic (PV) generator of the photovoltaic system in the form of direct current is converted by the inverter into grid-compliant alternating current and fed into the plurality of (usually three) phases of the local energy distribution grid, which in this context is also referred to as building installation. In this case, an inverter is also understood to mean a plurality of conversion apparatuses which jointly feed into a local energy distribution grid.

The energy generated by the photovoltaic generator can thus be used, via the building installation, for supplying local consumers. Excess energy is fed into the superordinate energy supply grid from the local energy distribution grid at a grid transfer point. Conversely, energy flows out of the superordinate energy supply grid into the local energy distribution grid if the power demand of consumers in the local energy distribution grid exceeds the electric power provided by the local energy generation device.

As an alternative or in addition to the local energy generation device, a local energy storage device, for example a battery, can be provided, wherein, similarly to the case of the energy generation device, energy can be output via the inverter into the local energy supply grid. Arrangements comprising such an energy storage device are used for at least temporarily ensuring the energy supply in the local energy distribution grid even in the event of failure of the superordinate energy supply grid. They can also be used to be able to control a withdrawal of energy from the superordinate energy supply grid depending on parameters such as the energy price or the availability of energy.

In the simplest and conventional case, an identical power is introduced into the individual phases of the local energy distribution grid by the inverter. Since, however, the consumers connected to different phases of the local energy distribution grid or possibly additionally existing (possibly single-phase) generation installations generally do not load the phases uniformly, however, this results in an unsymmetrical loading situation of the phases of the superordinate energy supply grid at the grid transfer point. The document EP 2 348 597 A1 discloses, in order to prevent such a load imbalance at the grid transfer point, the determination of the power or current flow on the individual phases at the grid transfer point and the operation of an inverter such that said inverter does not feed the power generated by a local energy supply device uniformly into the phases of the local energy distribution grid, but such that a feed-in or withdrawal situation results at the grid transfer point which is as symmetrical as possible.

Furthermore, it is known to design and operate inverters such that, in the event of a failure of the superordinate energy supply grid, the locally generated and/or stored energy is fed into the individual phases of the local energy distribution grid as required in order to ensure operation of the consumers in the local energy distribution grid.

With the mentioned method, it is not possible to ensure a supply to the consumers connected to the local energy distribution grid which lasts as long as possible if not all, but only some, of the phases, for example one or two of three phases of the superordinate energy supply grid, have a failure.

An object of the present invention consists in providing an inverter or an operating method for an inverter or an energy supply installation comprising an inverter, in which a supply to local consumers in a local energy distribution grid can also be provided when some of the phases of a polyphase energy supply grid have a failure, i.e. there is a so-called partial island situation.

This object is achieved by an inverter, an operating method for an inverter and an energy supply installation having the respective features of the independent claims. Advantageous configurations and developments are the subject matter of the dependent claims.

An inverter according to the invention of the type mentioned at the outset is characterized by the fact that it comprises a control connection for connection to the switching device such that individual phases of the local energy distribution grid are connectable to corresponding phases of the energy supply grid or are disconnectable from one another selectively via the control connection, and the inverter is configured to disconnect, in the event of a grid fault on at least one, but not all, of the phases of the energy supply grid, the at least one faulty phase of the energy supply grid from the corresponding phase of the local energy distribution grid via the control connection, and to apply a grid-compliant AC voltage to the at least one disconnected phase of the local energy distribution grid.

If a partial island situation occurs, i.e. if a fault occurs on one or more, but not all, of the phases of the superordinate energy supply grid, the local energy distribution grid can be decoupled, with respect to this phase or these phases, from the energy supply grid and thereupon grid-compliant and correct, in particular also in respect of the phase angle, alternating current can be applied to said local energy distribution grid by the inverter, so that the consumers connected to this phase in the local energy distribution grid can continue to be operated as far as possible without any interruptions.

In preferred configurations of the inverter, in this case the switching device and/or a grid monitoring device, which is configured for the selective identification of the grid fault on each individual one of the phases of the energy supply grid, are integrated in the inverter. In this way, a compact system design is achieved. In a further preferred configuration of the inverter, a signal connection for connection to an external grid monitoring device is provided. This is advantageous for being able to use a grid monitoring device which may already be in existence.

In further preferred configurations of the inverter, said inverter is configured to use preferably power provided by the energy generation device and/or the energy storage device and/or power drawn from a non-disconnected phase of the local energy distribution grid for application to the at least one disconnected phase of the local energy distribution grid. In all cases, the ability of the inverter to provide AC voltage with the required phase angle is utilized in order to continue to operate the consumers on the disconnected phase(s). In this case, locally generated or stored energy can be used or, for example, if insufficient such energy is available, energy which is drawn from other, non-faulty phases of the energy supply grid can also be used. Within the scope of the application, "continued operation" of the consumers is understood to mean that energy can be supplied to said consumers for a period of time which is markedly longer than the period of time of a grid period and, for example, is in the region of a few seconds and preferably a few minutes or longer.

Generally, a DC link having an arrangement of (buffer) capacitors is connected upstream of inverter bridges in order to smooth the DC voltage provided by the DC source despite the pulsed current consumption taking place during conversion into alternating current and, as a result, to increase the maximum peak current pulse that can be withdrawn. The DC-link/capacitor arrangement is therefore used for buffer-storing energy within a grid period, wherein the capacitance of such a DC-link/capacitor arrangement is insufficient for a temporary continued operation of the consumers within the meaning of the application. Within the scope of the application, a DC-link/capacitor arrangement is therefore not an energy storage device which is suitable for the continued operation of the consumers.

A method according to the invention for operating an inverter has the following steps: monitoring is performed to ascertain whether there is a grid fault in at least one phase, but not all of the phases, of the energy supply grid. If there is a grid fault, the switching device is actuated and the at least one faulty phase of the energy supply grid is decoupled from the corresponding phase of the local energy distribution grid. Then, grid-compliant AC voltage is applied to the at least one disconnected phase of the local energy distribution grid by means of the inverter. This results in the advantages already described previously in connection with the inverter.

In an advantageous configuration of the method, power required for application to the at least one disconnected phase of the local energy distribution grid is drawn from the energy generation device and/or from the energy storage device and is converted from direct current into alternating current by the inverter. Preferably, in this case excess power of the energy generation device can be fed by the inverter into non-disconnected phases of the local energy distribution grid.

In an advantageous configuration of the method, missing power for application to the at least one disconnected phase of the local energy distribution grid is drawn by the inverter from at least one non-disconnected phase of the local energy distribution grid and fed into the at least one disconnected phase. Preferably, the transmission of power from the at least one non-disconnected phase into the at least one disconnected phase of the local energy distribution grid takes place via a DC link of the inverter. In this case, therefore, there is first rectification of current from a non-disconnected phase and then conversion into alternating current for the disconnected phase. The capacity of the inverter to set a desired phase angle at an output is thus utilized in order to apply grid-compliant AC voltage to the disconnected phase, even in respect of the phase angle.

In further advantageous configurations of the method, the withdrawal of power from the energy storage device is controlled in such a way that the loading of the non-disconnected phases remains below a loading threshold value, in particular below a trigger threshold of a fuse. The method according to the invention provides the advantage that, in order to supply the consumers of the disconnected phases, the required power can be drawn, mixed, from the various mentioned sources. The withdrawal of power from the energy storage device can then advantageously be used, as required, in order to prevent overloading of the non-disconnected phases. In further advantageous configurations, other criteria can be taken into consideration as an alternative or in addition in order to control the distribution of the power among the various sources. Thus, the proportion of the power which is drawn from the non-disconnected phases can be determined depending on the state of charge of the energy storage device or the power capacity of the energy generation device or the loadability of the power sections of the inverter which are assigned to the non-disconnected phases, respectively.

An energy supply installation according to the invention is polyphase and comprises at least one inverter, at least one energy generation device and/or an energy storage device, and a switching device, via which the energy supply installation can be coupled to a likewise polyphase superordinate energy supply grid, and a grid monitoring device. The energy supply installation is characterized by the fact that a control device is provided, which is configured to actuate the switching device and/or the inverter, depending on signals from the grid monitoring device, in order to implement one of the abovementioned methods. In this case, too, the advantages already mentioned above are achieved. In this case, a polyphase inverter in which the mentioned control device is possibly integrated can be used. However, it is also possible for the control device to be a separate component of the energy supply installation, which separate component correspondingly actuates a polyphase inverter or else a plurality of single-phase inverters in order to implement the method according to the invention.

DETAILED DESCRIPTION

Figure 2:
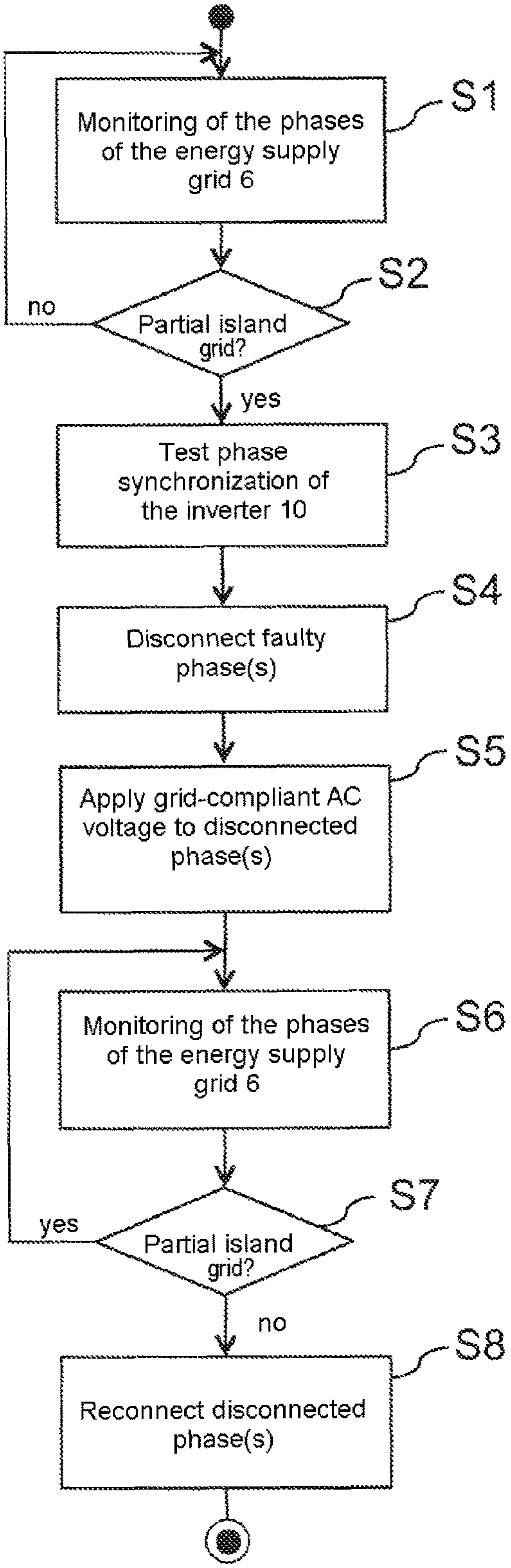

The invention will be explained in more detail below with reference to exemplary embodiments with the aid of two figures, in which:

FIG. 1 shows a schematic illustration of an arrangement comprising an inverter for supplying consumers via an energy distribution grid coupled to an energy supply grid, and FIG. 2 shows a flow chart of a method for operating an inverter.

FIG. 1 shows an energy supply installation for supplying electrical consumers in a building in the form of a block circuit diagram. The figure shows a building 1 having a local energy distribution grid 2, via which current is supplied to consumers 3, 4. The local energy distribution grid 2 is in this case illustrated, by way of example, as a three-phase energy supply grid comprising phases L1, L2 and L3 and a neutral conductor N. An optional PE conductor is not indicated for reasons of clarity. Single-phase consumers 3 and in this case, by way of example, a three-phase consumer 4 are connected to the energy distribution grid 2, distributed in the building 1.

SUMMARY

The local energy distribution grid 2 is coupled to a superordinate energy supply grid 6 at a grid transfer point 5. Said energy supply grid likewise provides three phases, a neutral conductor and possibly a PE conductor. In order to distinguish between them, the phases and the neutral conductor of the superordinate energy supply grid 6 are provided with the reference symbols L1', L2', L3' and N'. The block circuit diagram in FIG. 1 shows only those elements of the electrical installation which are important within the scope of the application in and on the building 1. It goes without saying that further switching and/or safety elements can also be arranged in the local energy distribution grid 2 as well as in the superordinate energy supply grid 6 at or upstream of the grid transfer point.

Furthermore, a photovoltaic (PV) generator is provided as local energy generation device 7 and a battery is provided as energy storage device 8 on or in the building 1. For reasons of a simple illustration, the designations PV generator 7 and battery 8 will be used below. The PV generator 7 and the battery 8 are connected to an inverter 10, which provides DC connections 11, 12 for this purpose. It will be mentioned that the use of a PV generator 7 together with a battery 8 is optional and a method according to the invention can also be implemented when only one of these two components, i.e. an energy generation unit or an energy storage device, is provided. The inverter 10 is a polyphase inverter, in this case three-phase in the same way as the energy distribution grid 2 and the energy supply grid 6. The inverter 10 is connected to the three phases L1, L2, L3 of the energy distribution grid 2 via an AC connection 13.

Furthermore, the inverter 10 has a control connection 14, which is connected to an internal control device, for an AC switching device 20. This AC switching device 20 has three switching paths which are actuable separately independently of one another and with which in each case the corresponding phases L1', L2' and L3' of the superordinate energy supply grid 6 are connected to the phases L1, L2 and L3 of the local energy distribution grid 2. The AC switching device 20 can be realized by three separate AC contactors, for example. It also goes without saying here that further switching, safety or control devices can be provided in the region of the connection between the inverter 10 and the PV generator 7 and/or the battery 8. These further devices can be either integrated in the inverter or realized as devices which are arranged outside the inverter, for example combined in an external switchbox.

Furthermore, a grid monitoring device 30 is provided, which checks on which of the phases L1', L2' and L3' of the superordinate energy supply grid 6 a grid-compliant AC voltage is provided. Within the scope of this application, "grid-compliant" should be understood to mean that relevant grid parameters such as, for example, the amplitude and the rms value of the voltage are in a value range which is required for proper operation of the consumers 3, 4. Additionally, reference is also made to the standard EN 50160. A non-grid-compliant state is also referred to below as a grid fault. Such a grid fault is present also in particular when measures possibly performed by the inverter 10 in respect of grid support, for example a feed-in of reactive current, into the affected phases, are insufficient to stabilize the grid parameters within the required range. Provision can be made for one measure for grid support to be firstly implemented for a certain time period, for example in the seconds range. Should this measure not be successful or should the fault state last for longer than the mentioned time period, it is assumed that there is a grid fault within the meaning of the application.

A state of the energy supply grid 6 in which all of the phases are provided in grid-compliant fashion, is referred to as the normal operating state. If one or more but not all of the phases have a grid fault, a partial island situation is present. The state of the individual phases L1', L2' and L3' detected by the grid monitoring device 30 is transmitted to the inverter 10 via a signal line, for example a data line or a communications link, via a signal connection 15. It is also possible for such a grid monitoring device to be integrated in the inverter 10.

In energy supply installations with alternative configurations, instead of the inverter 10 with an integrated control device, provision can also be made for a polyphase or a plurality of single-phase inverters to be connected to a separate control device, which actuates the inverter(s) in the same way as the switching device 20 depending on signals or data or information from the grid monitoring device 30.

In the following, it will initially be assumed that the energy supply grid 6 is in the normal operating state, in which it either provides to or else draws electric power from all three phases L1', L2' and L3'. Power provided by the PV generator 7 is fed into the local energy distribution grid 2 via the inverter 10. In the case of a surplus of locally generated power by the PV generator 7 in comparison with the consumption of the consumers 3, 4, an output of the surplus power into the energy supply grid 6 takes place. In the reverse case, if the locally generated power of the PV generator 7 is insufficient for supplying the consumers 3, 4, additionally power is drawn from the energy supply grid 6. In both cases, the inverter 10 can advantageously be configured to compensate for asymmetrical loading of the phases L1, L2 and L3 in the local energy distribution grid 2 such that a symmetrical withdrawal or feed-in situation is present on the phases L1', L2' and L3' at the grid transfer point 5. Possibly, a current in or from the battery 8 can also be used to achieve such compensation. A temporarily increased power consumption from the energy supply grid 6 or an increased feed into the energy supply grid 6 may also take place depending on the costs of electricity and/or requirements of the operators of the energy supply grid 6.

In a faulty operating state in which the superordinate energy supply grid 6 is not available over all of its phases L1', L2' and L3', a supply to the consumers 3, 4 via the inverter 10 from the PV generator 7 and/or the battery 8 can take place as long as this is possible in respect of the power available.

In a partial island situation for the building 1, in which there is a grid fault not for all phases L1', L2' and L3' of the superordinate energy supply grid 6, but only for some of the phases, a supply to the consumers 3, 4 takes place in the manner in accordance with the application illustrated below. Controlled by the inverter 10, the at least one faulty phase of the energy supply grid 6 is disconnected from the energy distribution grid 2 by means of the AC switching device 20. This is illustrated by way of example in FIG. 1 for the phase L3' of the energy supply grid 6. The phase not affected by the grid fault, in this case the phases L2' and L3', remain connected to the corresponding phases of the energy distribution grid 2.

Thereupon, grid-compliant alternating current is applied by the inverter 10 to the decoupled phase, in this case the phase L3, or else the decoupled phases of the local energy distribution grid 2, so that the single-phase consumers 3 connected to this phase can continue to be operated, as far as possible without any interruptions, in the same way as the three-phase consumer 4.

The power required for supplying the faulty phase or phases, in this case the phase L3, preferably originates from the PV generator 7. Furthermore, if a surplus of power generated locally by the PV generator 7 should be present, this power can be fed into unaffected, non-disconnected phases, in this case the phases L1 and L2, by the inverter 10. If in the reverse case the power generated locally by the PV generator 7 is insufficient for supplying the one or more disconnected phases, provision can be made for energy to additionally be drawn from the battery 8, if such energy is available. Alternatively, provision can be made for missing energy to be drawn from the phases which are not affected by the fault from the energy supply grid 6, either when there is no battery 8 provided or when discharge of the battery 8 is not desirable. In this way, a situation is in any case achieved in which the connected consumers 3, 4 can continue to be operated in the local energy distribution grid 2 even in a partial island situation, in which one or more, but not all of the phases L1', L2', L3' of the superordinate energy supply grid are faulty.

FIG. 2 shows a method according to the application for operating an inverter for supplying consumers which are connected to a polyphase local energy distribution grid. The method illustrated in FIG. 2 can be implemented, for example, by the energy supply installation shown in FIG. 1 and in particular by the inverter 10 illustrated in FIG. 1. By way of example, therefore, reference is made below to FIG. 1.

In a first step S1, the polyphase superordinate energy supply grid 6 is checked to ascertain whether all of the provided phases, in this case the phases L1', L2' and L3', provide grid-compliant AC voltage. This can take place, for example, by the grid monitoring device 30, which is arranged in the region of the grid transfer point 5. Alternatively, it is possible to implement the monitoring of the phases L1', L2' and L3' within the inverter 10.

In a next step S2, the result from step S1 is checked. If a normal state is present in which the superordinate energy supply grid 6 provides grid-compliant AC voltage on all phases L1', L2' and L3', the method branches back to the start in order to continuously perform the checking. If it is established in step S2 that at least one, but not all, of the phases L1', L2' and L3' demonstrate a fault state, the method branches on to a step S3.

The inverter 10 generally forms a reference signal from one of the three phases of the superordinate energy supply system 6, which reference signal is used as setpoint variable for the closed-loop control method, with which the inverter 10 determines the phase angle and therefore the frequency of the alternating current generated thereby at the AC outputs 13. In step S3, it is now ensured that this phase synchronization is performed on the basis of one of the non-faulty phases L1', L2' and L3'. This can take place, for example, by virtue of the fact that one of the non-faulty phases L1', L2' and L3' is connected to the supply as input signal for the reference voltage generation.

In a following step S4, the inverter 10 passes on a signal to the switching device 20 via the control connection 14, by means of which the one or more faulty phases L1', L2' and L3' of the superordinate energy supply grid 6 is disconnected from the corresponding phase L1, L2 and L3 of the local energy distribution grid 2.

Then, the inverter 10 provides, in a step S5, a grid-compliant alternating current on the disconnected phase(s) L1, L2 and L3 of the local energy supply grid 2. As already mentioned in connection with FIG. 1, the power required for the supply to the consumers 3, 4 connected to these phases is preferably drawn from the local energy supply device, i.e. in this case from the PV generator 7. Possibly surplus energy is fed in on the non-faulty phases L1', L2' and L3' of the energy supply grid 6. In this case, known methods for compensating for the powers fed in on these phases can be used independently of the consumption by the consumers 3, 4 on these phases. If the power of the local energy supply device is insufficient for supplying all of the consumers on the disconnected phases L1, L2 and L3 of the local energy supply grid 2, energy is correspondingly drawn from the non-faulty and non-disconnected phases L1', L2' and L3' of the energy supply grid 6. In this case, the exchange of the power from the at least one non-disconnected phase, i.e. the phases L2, L3 used in the example in FIG. 1, into the at least one disconnected phase, in the example the phase L1, of the local energy distribution grid then takes place via a DC link of the inverter 10.

In this case, in addition power can be drawn from the battery 8, for example in order to prevent the at least one non-disconnected phase from otherwise being overloaded and safety elements which are arranged between the energy supply grid 6 and the local energy distribution grid 2 being triggered. It is also possible to prevent the voltage of non-disconnected phases decreasing in an undesirable manner as a result of the loading. Furthermore, by means of a power withdrawal from the battery 8, excessively high loading of circuit parts of the inverter 10 assigned to the non-disconnected phases can be reduced.

During the feed-in process in step S5, the status of the phases L1', L2' and L3' of the energy supply grid 6 and in particular the status of the phases previously identified as faulty is again determined in step S6. If in a step S7, in which the result of step S6 is evaluated, it is established that the phases L1', L2' and L3' which have previously been identified as being faulty are still faulty, the method branches back to step S6.

If, on the other hand, it is established that the phases L1', L2' and L3' of the superordinate energy supply grid 6 which have previously been identified as being faulty are provided correctly and in grid-compliant fashion again, the method is continued with a step S8, in which the switching device 20 is instructed by the inverter 10 via the control connection 14 to connect the phases L1', L2' and L3' which are now provided in fault-free fashion to the corresponding phase(s) L1, L2 and L3 of the energy supply grid 2 again once the synchronization of the inverter 10 with these phases has been checked and ensured. Then, the inverter 10 can again be switched into a control mode for normal operation by virtue of, for example, power generated by the local energy supply device 7 being distributed uniformly among all of the phases or by the power being distributed among the three phases L1, L2 and L3 in such a way that symmetrical loading of the phases L1', L2' and L3' of the superordinate energy supply grid 6 is present at the grid transfer point 5. The method can then be implemented correspondingly again from step S1.

In the partial island situation in steps S6 and S7, the case may occur that the number of faulty phases is increased or decreased. In an alternative configuration of the method, this can be taken into consideration by virtue of decoupling and supply on an additionally failed phase likewise being taken into consideration as well as reconnection of a no longer faulty phase. The only precondition consists in that at least one phase is still correctly provided by the energy supply grid, which is used for the synchronization of the phase profiles and therefore frequencies for all of the phases provided in the local energy distribution grid and which possibly draws surplus power of the local energy supply device or possibly provides missing power for the consumers.

LIST OF REFERENCE SYMBOLS

1 Building
2 Local energy distribution grid
3 Single-phase consumer
4 Three-phase consumer
5 Grid transfer point
6 Superordinate energy supply grid
7 Energy generation device (PV generator)
8 Energy storage device (battery)
10 Inverter
11, 12 DC connection
13 AC connection
14 Control connection (for AC switching device)
15 Signal connection (for grid monitoring device)
20 AC switching device
30 Grid monitoring device

The invention claimed is:

1. An inverter comprising:

at least one DC connection for connection to an energy generation device and/or an energy storage device and comprising a polyphase AC connection for connection to a local energy distribution grid, which is coupled to a likewise polyphase superordinate energy supply grid via a switching device;

a control connection for connection to the switching device such that individual phases of the local energy distribution grid are connectable to corresponding phases of the energy supply grid or are disconnectable from one another selectively via the control connection; and wherein the inverter is configured to disconnect, in the event of a grid fault on at least one, but not all, of the phases of the energy supply grid, the at least one faulty phase of the energy supply grid from the corresponding phase of the local energy distribution grid via the control connection, and to apply a grid-compliant AC voltage to the at least one disconnected phase of the local energy distribution grid.

2. The inverter as claimed in claim 1, wherein the switching device is integrated in the inverter.

3. The inverter as claimed in claim 1, further comprising a signal connection for connection to a grid monitoring device configured to selectively identify the grid fault on each individual one of the phases of the energy supply grid.

4. The inverter as claimed in claim 3, wherein the grid monitoring device is integrated in the inverter.

5. The inverter as claimed in claim 1, said inverter being configured to use power provided by the energy generation device and/or the energy storage device for application to the at least one disconnected phase of the local energy distribution grid.

6. The inverter as claimed claim 1, said inverter being configured to draw power from a non-disconnected phase of the local energy distribution grid for application to the at least one disconnected phase of the local energy distribution grid.

7. A method for operating an inverter connected to an energy generation device and/or an energy storage device via at least one DC connection and connected to a local energy distribution grid via a polyphase AC connection, said local energy distribution grid being coupled to a likewise polyphase superordinate energy supply grid via a switching device, said method comprising:

monitoring whether there is a grid fault on at least one phase, but not all phases, of the energy supply grid;

actuating the switching device and disconnecting the at least one faulty phase of the energy supply grid from the corresponding phase of the local energy distribution grid upon detecting a grid fault during the monitoring; and applying grid-compliant AC voltage to the at least one disconnected phase of the local energy distribution grid by means of the inverter.

8. The method as claimed in claim 7, wherein a signal for actuating the switching device is output by the inverter.

9. The method as claimed in claim 7, wherein power required for application to the at least one disconnected phase of the local energy distribution grid is drawn from the energy generation device and/or from the energy storage device and is converted from direct current into alternating current by the inverter.

10. The method as claimed in claim 9, wherein excess power of the energy generation device is fed by the inverter into non-disconnected phases of the local energy distribution grid.

11. The method as claimed in claim 9, wherein missing power for application to the at least one disconnected phase of the local energy distribution grid is drawn from at least one non-disconnected phase of the local energy distribution grid by the inverter and fed into the at least one disconnected phase.

12. The method as claimed in claim 11, wherein the transmission of power from the at least one non-disconnected phase into the at least one disconnected phase of the local energy distribution grid takes place via a DC link of the inverter.

13. The method as claimed in claim 11, wherein the withdrawal of power from the energy storage device is controlled in such a way that the loading of the non-disconnected phases remains below a loading threshold value of a fuse.

14. The method as claimed in claim 11, wherein the proportion of the power which is drawn from the non-disconnected phases is determined depending on the state of charge of the energy storage device or the power capacity of the energy generation device or the loadability of the power sections of the inverter which are assigned to non-disconnected phases, respectively.

15. A polyphase energy supply installation comprising at least one inverter, at least one energy generation device and/or an energy storage device, and a switching device to couple the energy supply installation to a likewise polyphase superordinate energy supply grid, a grid monitoring device, and a control device configured to actuate the switching device and/or the inverter, depending on signals from the grid monitoring device, in order to implement a method, comprising:

monitoring whether there is a grid fault on at least one phase, but not all phases, of the energy supply grid using the grid monitoring device;

actuating the switching device and disconnecting the at least one faulty phase of the energy supply grid from the corresponding phase of a local energy distribution grid upon detecting a grid fault during the monitoring; and applying grid-compliant AC voltage to the at least one disconnected phase of the local energy distribution grid by means of the inverter.

* * * * *